May 1, 1923.
E. H. PAYNE ET AL
1,453,766
CATALYST AND METHOD OF MAKING THE SAME
Filed Aug. 18, 1920
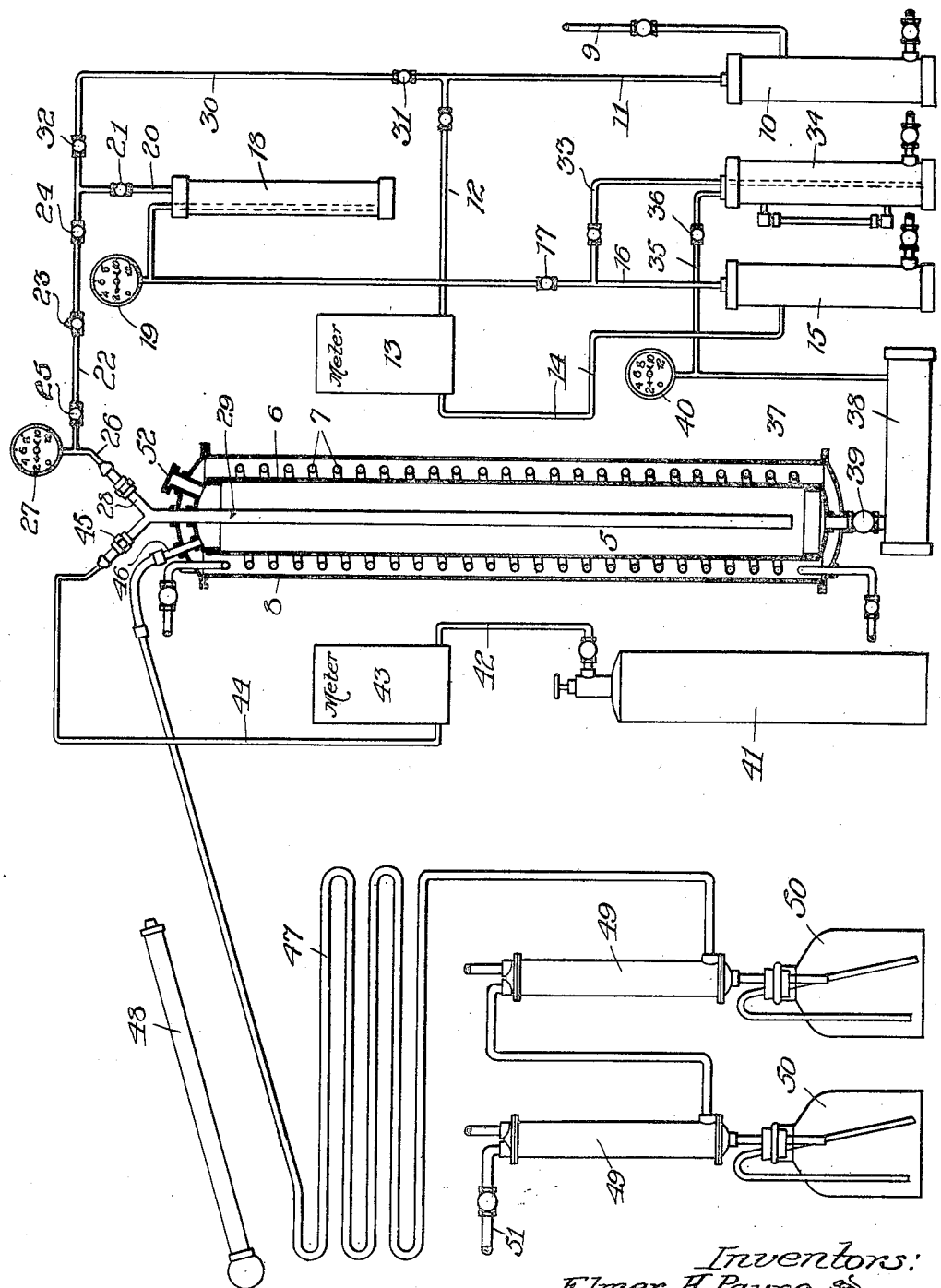
Inventors:
Elmer H. Payne
Samuel A. Montgomery,
By Dyrenforth, Lee, Chritton & Wiles
Attys Patented May 1, 1923.

1,453,766

UNITED STATES PATENT OFFICE.

ELMER H. PAYNE AND SAMUEL A. MONTGOMERY, OF WOODRIVER, ILLINOIS, ASSIGNORS TO STANDARD OIL COMPANY, OF WHITING, INDIANA, A CORPORATION OF INDIANA.

CATALYST AND METHOD OF MAKING THE SAME.

Application filed August 18, 1920. Serial No. 404,318.

*To all whom it may concern:*

Be it known that we, ELMER H. PAYNE and SAMUEL A. MONTGOMERY, citizens of the United States, residing at Woodriver, in the county of Madison and State of Illinois, have invented a new and useful Improvement in Catalysts and Methods of Making the Same, of which the following is a specification.

The present invention relates to catalysts more particularly suitable for the chlorination of gaseous hydrocarbons, and to a process for making the same, and will be fully understood from the following description thereof, illustrated by the accompanying drawing, in which apparatus suitable for carrying out the invention is illustrated.

Referring more particularly to the drawings, the numeral 5 indicates the reaction vessel, which may consist of a central reaction chamber 6, of lead or other suitable inert material such as stone ware, and which is surrounded by a heating coil 7 and an external jacket 8. Gas is drawn from a suitable gas holder or main (not shown) and enters the system thru the pipes 9, which lead it into the trap 10. It issues from the trap 10 thru the pipe 11, from which it passes thru the valved pipe 12, the flowmeter 13 and the pipe 14 to the trap 15. From the trap 15 it passes out thru pipe 16 provided with valve 17 to the humidifier 18. A suitable pressure gauge 19 is provided on the line 16. In the humidifier 18 the gas takes up moisture, and the moist gas passes out of the humidifier thru the pipe 20 provided with a valve 21 and the pipe 22 provided with check valve 23 and valves 24 and 25 to the small pipe 26 which is connected upon the one hand to the pressure gauge 27 and upon the other to a fork 28 of the tube 29 leading downwardly thru the jacket 8 into the lower portion of the reaction chamber 6. A by-pass for gas from the trap 10 to the reaction chamber is provided by the pipe 30 which connects with the pipe 11 leading from trap 10 with the pipe 22. The pipe 30 is provided with a valve 31 near its point of connection with the pipe 11 and with a valve 32 near its point of connection with the pipe 22. When gas is passed to the reaction chamber thru this by-pass, the trap 15, the meter 13, and the humidifier 18 are cut off by closing the valve in pipe 12 and the valve 21 in pipe 20. Means are likewise provided for introducing the gas directly into the bottom of the reaction chamber, in which case the valve 17 and the pipe 16 is closed and the gas passes from the pipe 16 thru the valved pipe 33 into the humidifier 34, from which it issues thru the pipe 35 provided with check valve 36 into the pipe 37 connected to the trap 38. From the trap 38 it passes up thru valve pipe 39, into the bottom of the reaction chamber 6. A pressure gauge 40 is provided on line 37. Chlorine, which may suitably be supplied in a tank 41 passes therefrom thru pipe 42, flowmeter 43 and pipe 44 to the other fork 45 leading into the tube 29, which carries the chlorine to the bottom of the reaction chamber.

Vapors issuing from the reaction chamber thru pipe 46 pass thru the coils of transparent quartz or glass tubing 47, in which they are exposed to the light rays from a suitable light source such as the mercury vapor arc 48, and subsequently pass on thru a succession of scrubbers 49, 49, in which they deposit the liquid chlorinated products, which collect in the receptacles 50, 50.

The gaseous products of chlorination pass on thru pipes 51 to any suitable low temperature condensing or compressing system adapted for their recovery.

In carrying out the present invention, a suitable catalyst is prepared which is capable of accelerating the chlorination of the gas and which is not effected nor poisoned by the materials undergoing reaction or their products. This catalyst may be prepared in any suitable reaction chamber; it is preferred, however, to prepare it in the reaction chamber 6 in which the chlorination of the gas is subsequently to be effected.

To prepare the catalyst the internal reaction chamber 6 may be filled about two thirds full of high boiling point oil, for example, a paraffine distillate having an initial boiling point of about 450° F. The oil is then heated by means of the steam coils 7 carrying steam at desired pressure, and chlorine is then passed therethru, its rate being controlled to maintain the temperature of the oil at about 300° F. At the same time a relatively small proportion of gas is conducted from the trap 10 thru the pipe 11, the by-pass 30 and the pipe 22 into the tube 29, leading into the bottom of the reaction chamber. Some chlorination of this gas takes place, but its primary function is to remove the products of the chlorination treatment of the oil from the reaction chamber. The chlorine is supplied slowly, to prevent excessive rise in temperature of the oil. The passage of the chlorine is continued until the catalyst substantially ceases evolving hydrochloric acid. At this point the product in the reaction chamber is a solid mass resembling coal in its color and fracture. It is exceedingly porous, it being found on displacement with water that one gram of the catalyst contains approximately 3¾ to 4 cubic centimeters of air. An average analysis of the products thus obtained gives the following results:

| | |
|---|---|
| Per cent chlorine by weight | 19.16% |
| Per cent ash by weight | 3.22% |
| Per cent carbon-disulphid soluble by weight | 21.90% |
| Per cent carbon tetrachloride soluble by weight | 17.20% |
| Per cent hexane soluble | 16.89% |

Substantially all of the chlorine present in the catalyst appears to be in the combined form.

The preparation of the catalyst has been described in connection with the use of a white oil distillate. It has been found, however, that other hydrocarbon oils may be substituted in whole or in part, such as road oil, or shale oil, and likewise asphalts, natural waxes, or coal may be in part substituted for the oil. Coal, comminuted to from 20 to 50 or other suitable mesh may be substituted for the oil up to 80 to 90% of the total material treated.

The catalyst may likewise be formed in a separate container, comminuted and introduced as a powder into the internal reaction chamber 6. An opening 52 provided with a suitable removable plug is provided for this purpose.

After the reaction chamber 6 has been completely charged with the completed catalyst, it may be employed for the chlorination of hydrocarbon gas in the following manner: The by-pass line in the gas supply is closed by closing valves 31 and 32, and the valves in lines 12 and 20 are opened in order that the incoming gas may travel thru the meter 13, the traps 15, and the humidifier 18 before it enters the reaction chamber thru the tubes 29. The gas employed is, in the present example, a pressure still gas containing a lower proportion of methane and a higher proportion of unsaturated components than natural gas. Other still gases or natural gas or mixtures of the hydrocarbon gases may, however, be employed. At the same time chlorine is introduced thru the meter 43 and the pipes 44. If desired, the gas, instead of being introduced thru the tube 29, may be diverted from the humidifier 18 by closing valve 17 and caused to travel thru humidifier 34 and trap 38 into the bottom of the reaction chamber.

The relative proportions of chlorine and gas introduced into the reaction chamber are preferably three to one by volume. With this proportion, the most satisfactory yield of liquid chlorinated products is found to be produced. The temperature of the reaction chamber is controlled by the use of steam at desired pressure in the coils 7 to maintain the temperature within the reaction chamber at about 300° F. The products escaping from the reaction chamber pass thru the pipe 46 into the tubing 47, in which a further chlorination results by reason of the influence of the light rays from a suitable light source 48, indicated as a mercury vapor arc. This further chlorination goes smoothly and without explosive violence, and the products of the complete chlorination process are passed thru scrubbers 49, 49, the liquid product collecting in the receptacles 50, 50. The gaseous products issue thru the pipe 51. This issuing gas is found to contain methyl chloride. This may be condensed by the use of suitable freezing mixtures. The chlorinated products may be refined by treatment with caustic soda to remove hydrochloric acid and traces of chlorine, and steam distillation. After such treatment the distillate is water white and has an agreeable odor. Its specific gravity approximates 1.364, its initial boiling point is about 134° F. and its dry point about 380° F.

With the proportions of chlorine and gas above described, the chlorine is almost completely combined with the gas in the course of the reaction. Notwithstanding the relatively high proportion of higher hydrocarbons and of unsaturated hydrocarbons in the gases treated, as compared with those present in natural gas, substantially no solid compounds such as hexachlorethane, were found under the conditions of reaction described, even when the proportion of chlorine to gas was increased greatly above the proportion of three to one.

Altho the present invention has been described in connection with certain details of apparatus and procedure for carrying it out, it is not intended that these details shall be regarded as limitations upon the scope of the invention, except in so far as included in the accompanying claims.

We claim:

1. The process of preparing a catalytic material which consists in passing chlorine thru a hydrocarbon material while maintaining a temperature of about 300° F. and continuing such passage of chlorine to the formation of a coal-like solid mass.

2. The process of preparing a catalytic material which consists in passing chlorine thru a liquid hydrocarbon material while maintaining a temperature of about 300° F. and continuing such passage of chlorine to the formation of a coal-like solid mass.

3. The process of preparing a catalytic material which consists in passing chlorine thru a liquid hydrocarbon material admixed with solid carbonaceous material while maintaining a temperature of about 300° F.

4. The process of preparing a catalytic material which consists in passing chlorine through a liquid hydrocarbon material admixed with solid carbonaceous material while maintaining a temperature of about 300° F. and continuing such passage of chlorine to the formation of a coal-like solid mass.

5. The process of preparing a catalytic material which consists in passing chlorine thru a liquid hydrocarbon material while maintaining a temperature af about 300° F. and continuing the operation until the formation of HCl substantially ceases.

6. The process of preparing a catalytic material which consists in passing chlorine thru a liquid hydrocarbon material while maintaining a temperature of about 300° F. until the formation of HCl substantially ceases and simultaneously passing a gaseous material thru the mixture to remove evolved reaction products.

7. As a catalytic material, the porous, coal-like product of chlorination of liquid hydrocarbon material at 300° F. to substantial cessation of the formation of HCl.

8. As a catalytic material, the porous, coal-like product of chlorination of liquid hydrocarbon material at 300° F. containing about 19.16% of chlorine.

ELMER H. PAYNE.
SAMUEL A. MONTGOMERY.